Aug. 9, 1955  B. H. McLENNAN  2,714,716
EYE SHIELD
Filed Nov. 5, 1952
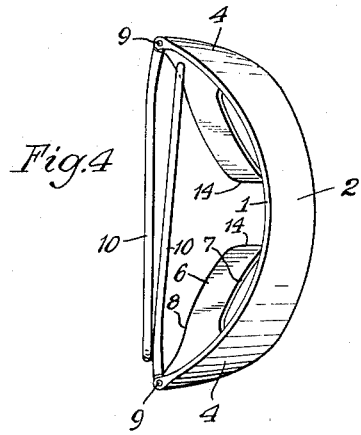
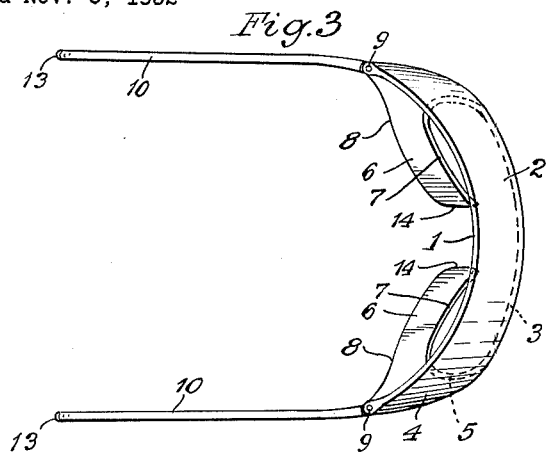
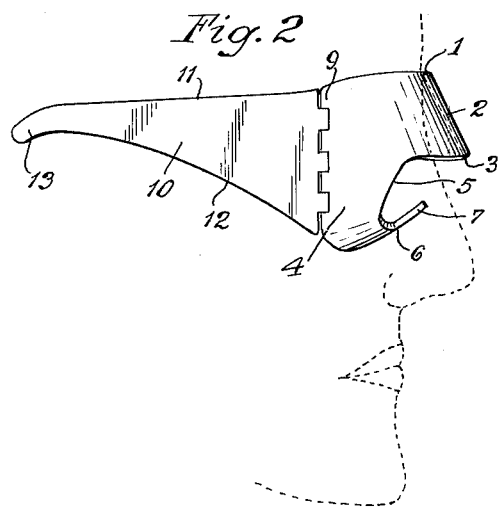
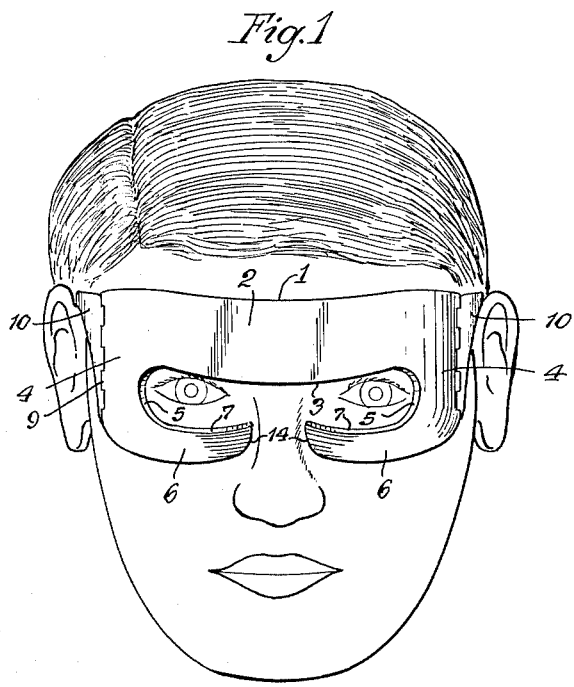
Inventor
Barbara H. McLennan
by Parker & Carter
Attorneys

United States Patent Office 2,714,716
Patented Aug. 9, 1955

2,714,716

EYE SHIELD

Barbara H. McLennan, Evanston, Ill.

Application November 5, 1952, Serial No. 318,907

1 Claim. (Cl. 2—12)

My invention relates to eye shields and particularly to eye shields adapted to prevent entry of the sun into the eyes of the wearer.

Prior devices designed to protect the eyes from the rays of the sun, normally known as sun goggles, have invariably employed a shield in front of the eyes of the wearer in his direct line of vision. There have been numerous complaints that such a device produces a form of eyestrain and in some cases has been held to be the cause of headaches. Accordingly, it is one object of my invention to provide an eye shield which shall be effective to shield the eyes from all rays of the sun while, at the same time, permitting normal and clear vision by the wearer of my eye shields.

Another object of my invention is to provide an eye shield which shall be effective to shield the eyes of the wearer from the rays of the sun without the requirement for any obstruction in the direct line of vision of the wearer.

Another object of my invention is to provide an eye shield which shall be effective to prevent the impingement of the rays of the sun on the eyes of the wearer no matter from which direction the rays of the sun approach.

Another object of my invention is to provide an eye shield which shall be effective to prevent the reflection of the sun's rays from an object beneath the eyes of the wearer upward into said eyes.

Another object of my invention is to provide an eye shield which shall be effective to fit snugly against the facial contours of the wearer at a variety of points on the wearer's face.

Another object of my invention is to provide an eye shield which may be easily and economically manufactured and which may be made from plastic materials.

It will be realized that, since my device escapes the use of an obstruction in the direct line of vision of the wearer, it is possible for the wearer, should he tilt his head backward and look up directly at the sun, to cause the sun's rays to impinge on his eyes. This is not a normal position of the head, however, and thus the fact that the wearer could so cause the impingement of the sun's rays on his eyes produces no disadvantage in my device, any more than the fact that the wearer may remove prior types of sun goggles to achieve the same effect.

While it is in the nature of my device to prevent the impingement of the sun's rays either directly or by reflection upon the eyes of the wearer while at the same time permitting normal clear vision, it will be realized that the wearer of my device may, merely by tilting his head forward and looking upward, utilize the shield above the eyes as a normal sun goggle through which he may look at particularly bright objects or even directly at the sun.

Other purposes of my invention will, in part, be obvious and, in part, appear hereinafter.

For a more complete understanding of the nature and scope of my invention, reference may be had to the following detailed description, taken together with the accompanying drawings, in which:

Fig. 1 is a front view of my device illustrating the manner in which it may be worn on the face of a person;

Fig. 2 is a side view of my device as it appears when being worn on the face of a person;

Fig. 3 is a top view of my device arranged in position to be placed on the face of a person; and Fig. 4 is a top view of my device arranged in folded position.

Like parts are indicated by like symbols throughout the specification and drawings.

Referring now particularly to Fig. 1 of the drawing, it will be observed that reference character 1 generally indicates a top portion or upper rim of my eye shield, which is curved to fit the forehead of the wearer at all points from one side of the forehead to the opposite side of the forehead, as illustrated best in Figs. 2, 3 and 4. Downwardly inclined from the upper rim portion 1 is the upper shield 2 which has the curved terminal portion or lower rim 3. The downwardly inclined awning or shield 2 follows the curvature of the upper rim 1 and terminates at either side of the forehead of the wearer or at the point commonly known as the temples of the wearer. Depending from the side terminal portions of the shield 2 and in vertical alignment therewith are the curved side members 4. The side members 4 are bounded by the forward curved edges or rims 5.

Extending inwardly and upwardly from the bottom portions of the side members 4 are the lower shields 6 which have the forward and upwardly directed edge portions 7 and the rear generally S-shaped edge portions 8.

Flexibly secured to the rearward edge portions of the shield 2 and the side members 4, as by the hinge 9, are the rearwardly extending earpieces 10. It will be observed that the earpieces 10 are formed in a rearwardly converging generally triangular shape, having its widest point along the hinge 9 so as to provide a smooth line along the upper rim 1 of the shield 2 and the upper edge 11 of the earpiece 10 and along the lower rearward edge 8 of the lower eye shield 6 and the lower edge 12 of the earpiece 10. The earpiece may be formed of the same material as the shield 2, the side members 4, and the lower shield 6 so as to insure that rays of the sun approaching the wearer from the side and the rear are prevented from entering between the shield and the wearer's eyes. The earpieces 10 may terminate in a downwardly curved portion, generally illustrated at 13, to facilitate attachment of the earpieces 10 to the ears of the wearer.

It will be realized that the entire device may be made in one piece, as by molding out of plastic, for example, Lucite, Bakelite, or any other moldable, transparent plastic material. The material is colored to provide the antiglare quality required in normal sun glasses or sun goggles. While the device may be made in one piece, I find it advantageous to provide the hinge 9 between the earpieces 10 and the forward portion of the device in order to provide a foldable structure which may be stored or carried in a purse or pocket. While it is advisable to form the device out of transparent plastic material which is colored to soften or deflect the rays of the sun, it will be seen that the device could be made opaque. Since, however, it is advisable that the wearer be able to see, when necessary, through the side members 4, it is normally advisable to form the device out of colored transparent material. Moreover, as above mentioned, when the shield 2 is formed of transparent colored material it can be used, when it is desired, to look directly at the rays of the sun or other very bright objects, as a normal sun goggle merely by tilting the head forward and looking through the shield 2 or, when the source of bright light is above the wearer, merely by looking upward through the shield.

While it is difficult to show in the drawings, it is important to understand that my device is formed in a particular manner to properly contact the face of the wearer at all points along all outer edges of the device. Thus, the upper rim 1 contacts the forehead of the wearer at all points from one side of the forehead to the other, the earpieces 10 continuing this contact with the sides of the forehead or temples rearwardly to a point above the ears, as illustrated in Fig. 1. The lower edges 8 of the lower shield 6 have a slight S-curve which permits the lower shield 6 to contact the cheek of the wearer from a point adjacent the wearer's nose just above the nostrils to the sides of the cheeks and slightly rearwardly from whence the earpiece 10 continues the contact along the side of the cheek rearwardly to a point just above the ear, again as illustrated in Figs. 1 and 2. The inner terminating edge portions 14 of the lower shield 6 are formed and adapted to contact and rest upon either side of the nose of the wearer at a point just above the nostrils. It will be realized that whereas I show a space between the edge portions 14, the device could be constructed with a bridge over this space formed and adapted to lie upon the nose of the wearer, however, such a structure tends to provide an obstruction to vision and is, therefore, not desirable. Thus, it will be seen that my device contacts the face of the wearer at all points above, at either side, and below the eyes of the wearer, effectively shielding the eyes against the entrance of the rays of the sun between my device and the face or head of the wearer.

The length and angle of the downwardly inclined shield 2 and the generally concave shape of the lower rim 3 are designed to provide a shield extending from a point on the wearer's forehead above his eyes to a point just above the line of vision. Similarly, the forward edges 5 of the side members 4 are curved to shield the maximum amount of rays approaching from the sides, while at the same time terminating adjacent the line of vision of the wearer. In like manner, the forward edge portions 7 curve below the eyes of the wearer at a point forward of the cheek just short of the line of vision of the wearer to provide the maximum amount of shielding from reflected light rays emanating from below the eyes of the wearer.

While the device is shown in Fig. 3 as being so proportioned as to allow the earpieces 10, when opened, to extend directly to the rear from the forward portion, it will be seen that the insertion of the wearer's head between the earpieces 10 will tend to spread the terminal portions 13 thereof even further apart and thus provide a binding effect of the earpieces 10 against the sides of the head of the wearer.

Since it is one of the features of my invention to provide an eye shield having all of its edge portions designed to fit the face of the wearer, it is anticipated that varying sizes will be provided to fit the faces of persons of varying ages. Likewise, the curved side portions 4 and the curve of the shield 2 may be easily and simply enlarged to permit the wearing of my eye shield in conjunction with the wearing of ordinary eyeglasses or spectacles.

It will be understood that the invention may be embodied otherwise than as herein specifically shown or described and that in the illustrated forms various changes may be made without departing from the underlying idea or spirit of the invention. Therefore, I do not wish to be limited to the constructions herein specifically illustrated or described, except to the extent which may be required by the scope of the appended claim.

Having thus described my invention, what I claim and desire to secure by Letters Patent is:

An integrally formed, unitary eye shield comprising an elongated, upper, band-like portion having an upper rear, longitudinal edge shaped to conform to the forehead of the wearer in close abutting relationship, said upper portion extending longitudinally from a point adjacent one of the wearer's temples to a point adjacent the other of the wearer's temples, said upper portion terminating in a lower front, longitudinal edge generally parallel to said upper rear edge, said upper portion being longitudinally curved, extending downwardly and forwardly from said upper rear edge at an acute angle from vertical and being of width for disposing said lower front edge immediately above the normal line of vision of the eyes of the wearer in substantially horizontally and forwardly spaced relationship to the bridge of the wearer's nose; side portions extending downwardly and forwardly at an acute angle from vertical from each end of said upper portion respectively, said side portions each having a generally upright rear edge shaped to conform to the portions of the wearer's face beyond the outer ends of the wearer's eyes in close abutting relationship, said side portions each having a generally upright forward edge extending downwardly and rearwardly from said front lower edge of the upper portion at an acute angle from the vertical, said side portions being of dimension for disposing said forward edges of the side portions immediately to the outer side of the normal line of vision of the corresponding eye of the wearer; and elongated, lower strip-like portions extending longitudinally inwardly from the lower extremities of the side portions toward the nose of the wearer, said lower portions each having a generally horizontal, longitudinally curved lower rear edge shaped to conform to the wearer's cheeks in close abutting relationship, said lower portions each having an upper front longitudinal edge, said lower portions each extending transversely upwardly and forwardly from said lower rear edges thereof at an acute angle from vertical and being of width for disposing said upper front edges thereof immediately below the normal line of vision of the corresponding eye of the wearer, the ends of the lower portions proximate the wearer's nose terminating immediately adjacent the sides of the latter and in spaced relationship to each other below the normal line of vision of the corresponding eyes of the wearer, said rear edges of the side portions being adapted for interconnection therewith of means for holding the shield in place on the head of the wearer.

References Cited in the file of this patent

UNITED STATES PATENTS

| | | |
|---|---|---|
| 1,198,337 | Folsom | Sept. 12, 1916 |
| 2,276,372 | Courtney | Mar. 17, 1942 |
| 2,441,659 | Chalmers | May 18, 1948 |
| 2,545,078 | Gardner | Mar. 13, 1951 |
| 2,645,774 | Dale | July 21, 1953 |